United States Patent [19]
Nagaoka

[11] Patent Number: 4,766,375
[45] Date of Patent: Aug. 23, 1988

[54] HEAD ASSEMBLY HAVING FREE AXIAL AND RESTRICTED PERPENDICULAR MOVEMENT IN A MAGNETIC SCALE

[75] Inventor: Kazuo Nagaoka, Tokyo, Japan

[73] Assignee: Sony Magnescale Corporation, Tokyo, Japan

[21] Appl. No.: 836,753

[22] Filed: Mar. 6, 1986

[30] Foreign Application Priority Data

Mar. 13, 1985 [JP] Japan .................................. 60-50098

[51] Int. Cl.$^4$ .................................................. G01B 7/02
[52] U.S. Cl. ........................................ 324/208; 324/262
[58] Field of Search ............... 324/207, 208, 206, 212, 324/217, 226, 260–262, 239, 240; 33/125 C, 125 A; 360/78, 89, 2, 104, 105, 130.3; 364/560–564, 581

[56] References Cited

U.S. PATENT DOCUMENTS

| | | | |
|---|---|---|---|
| 2,875,524 | 3/1959 | Bower et al. | 33/125 C |
| 2,902,765 | 9/1959 | Chater | 33/125 C |
| 2,918,666 | 12/1959 | Brower et al. | 33/125 C X |
| 3,010,063 | 11/1961 | Rhoades | 33/125 C |
| 3,582,769 | 6/1971 | Brandenburg | 33/125 C X |
| 4,037,325 | 7/1977 | Weber et al. | 33/125 C |
| 4,122,505 | 10/1978 | Kuijk | 324/252 X |
| 4,149,319 | 4/1979 | Nelle | 33/125 C |
| 4,215,480 | 8/1980 | Fisher et al. | 33/125 C |
| 4,226,024 | 10/1980 | Westerberg et al. | 33/125 C X |
| 4,295,742 | 10/1981 | Nelle et al. | 33/125 C X |
| 4,380,734 | 4/1983 | Allerton | 324/225 |
| 4,400,870 | 8/1983 | Ohkubo et al. | 33/125 C |
| 4,484,391 | 11/1984 | Narimatsu | 324/208 X |
| 4,541,181 | 9/1985 | Giacomello | 31/125 C |
| 4,649,648 | 3/1987 | Nagaoka et al. | 33/125 |
| 4,663,588 | 5/1987 | Himuro et al. | 324/207 |

FOREIGN PATENT DOCUMENTS 3128656 2/1983 Fed. Rep. of Germany .
3221445 7/1983 Fed. Rep. of Germany .

Primary Examiner—Reinhard J. Eisenzopf
Assistant Examiner—Warren S. Edmonds
Attorney, Agent, or Firm—Ronald P. Kananen

[57] ABSTRACT

A magnetic reading head assembly for a magnetic scale comprises a magnetic scale member and a magnetic reading head. The magnetic reading head has a through opening through which the magnetic scale member extends. The assembly is also provided with an elastic or resilient member which exerts a biasing force on the magnetic reading head member holding the magnetic reading head in a predetermined position relative to the magnetic scale member.

8 Claims, 2 Drawing Sheets

HEAD ASSEMBLY HAVING FREE AXIAL AND RESTRICTED PERPENDICULAR MOVEMENT IN A MAGNETIC SCALE

BACKGROUND OF THE INVENTION

1. Field of the Invention

The present invention relates generally to a magnetic or linear scale which has a magnetic reading head providing signals corresponding to indicia recorded on a magnetic scale member to indicate accurately any relative displacement between the magnetic head and the magnetic scale member. More specifically, the invention relates to an improved magnetic reading head assembly which allows more precise and accurate indication of relative displacement of the magnetic reading head and the magnetic scale member, in comparison to the prior art. Even more specifically, the invention relates to a magnetic reading head assembly adapted for the type of magnetic scale which has a magnetic reading head essentially coaxial with the magnetic scale member.

2. Description of the Prior Art

As is well known, a magnetic scale or linear scale comprises a magnetic scale member and one or more magnetic reading head members. The magnetic scale member extends through openings through the magnetic reading heads so that the magnetic scale member and the magnetic reading heads can be displaced linearly along the axis of the magnetic scale member.

In order to perform accurate linear measurement of the relative displacement between the magnetic scale member and the magnetic reading heads, it is desirable to establish engagement between the openings of the magnetic reading heads and the magnetic scale member with minimum play therebetween so as to ensure truly linear movement of the magnetic reading head relative to the magnetic scale member. However, it has been considered difficult or even impossible to completely eliminate play between the magnetic reading head and the magnetic scale due to tolerances necessary for production. Such play between the opening of the magnetic reading head and the magnetic scale member allows misalignment of the magnetic reading head relative to the magnetic scale member during relative movement of the magnetic scale member and the magnetic reading head. This results in unstable movement of the magnetic reading head relative to the magnetic scale member.

In other words, it has been difficult to hold the axis of the opening of the magnetic reading head parallel to and in a predetermined positional relationship with the axis of the magnetic scale member, due to misalignment of the magnetic reading head relative to the magnetic scale member.

SUMMARY OF THE INVENTION

Therefore, it is an object of the present invention to provide a magnetic scale which can solve the foregoing problem in the prior art.

More specifically, the invention relates to a magnetic reading head assembly which successfully and satisfactorily holds a magnetic reading head in alignment with a magnetic scale member, and thus holds the axis of the magnetic reading head parallel to and in a predetermined positional relationship with the axis of the magnetic scale member.

In order to accomplish the aforementioned and other objects, a magnetic reading head assembly for a magnetic scale, according to the present invention, comprises a magnetic scale member and a magnetic reading head. The magnetic reading head has a through opening through which the magnetic scale member extends. The assembly is also provided with an elastic or resilient member which exerts a biasing force on the magnetic reading head member so as to hold the magnetic reading head at a predetermined position relative to the magnetic scale member.

In accordance with one aspect of the invention, a magnetic reading head assembly for a magnetic scale which has an elongated magnetic scale member, comprises a magnetic head defining an axial opening through which the magnetic scale member extends, and first means for restricting movement of the magnetic head in a direction perpendicular to the axis of the magnetic scale member and thereby holding the axis of the axial opening substantially parallel to and in a predetermined positional relationship with the axis of the magnetic scale member.

The magnetic reading head assembly further comprises a carriage supporting the magnetic head and itself free to move along the magnetic scale member and second means for restricting axial movement of the magnetic head relative to the carriage.

The first means comprises a resilient member for resiliently restricting movement of the magnetic head perpendicular to the axis of the magnetic scale member. The magnetic reading head assembly further comprises third means for absorbing torsional forces exerted on the carriage so as to isolate the magnetic head from torsional forces. The first means resiliently biases the magnetic head against the magnetic scale member so that the inner periphery of the axial opening of the magnetic head is in constant contact with the outer periphery of the magnetic scale member.

In the preferred embodiment, the first means comprises a pair of resilient members biasing the magnetic head against the magnetic scale member so that the inner periphery of the axial opening of the magnetic head is in constant contact with the outer periphery of the magnetic scale member, the pair of resilient members being adapted to exert biasing forces in essentially perpendicular directions to each other.

According to another aspect of the invention, a magnetic scale comprises an elongaged magnetic scale member, a magnetic head defining an axial opening through which the magnetic scale member extends, and means for restricting movement of the magnetic head in a direction perpendicular to the axis of the magnetic scale member and whereby holding the axis of the axial opening substantially parallel to and in a predetermined positional relationship with the axis of the magnetic scale member.

According to a further aspect of the invention, a method for implementing measurement of relative displacement between an elongated magnetic scale member and a magnetic head defining an axial opening through which the magnetic scale member extends, comprises the steps of:

applying a resilient force to the magnetic head for restricting swaying motion thereof relative to the magnetic scale, thereby holding the axis of the axial opening substantially parallel to the axis of the magnetic scale member and in a predetermined positional relationship therewith;

causing sliding relative movement between the magnetic scale member and the magnetic head while holding the axis of the axial opening in the predetermined relationship with the axis of the magnetic scale member; and measuring the magnitude of the relative displacement between the magnetic scale member and the magnetic head while holding the axis of the axial opening in the predetermined relationship with the axis of the magnetic scale member.

The inner periphery of the axial opening of the magnetic head contacts the outer periphery of the magnetic scale member in the predetermined positional relationship between the axis of the axial opening of the magnetic head and the axis of the magnetic scale member.

The resilient force is applied to the magnetic head from two different directions so as to bias the magnetic head in two essentially perpendicular directions.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiments illustrated but are for explanation and understanding only.

In the drawings.

DESCRIPTION OF THE PREFERRED EMBODIMENTS

Figure 1:
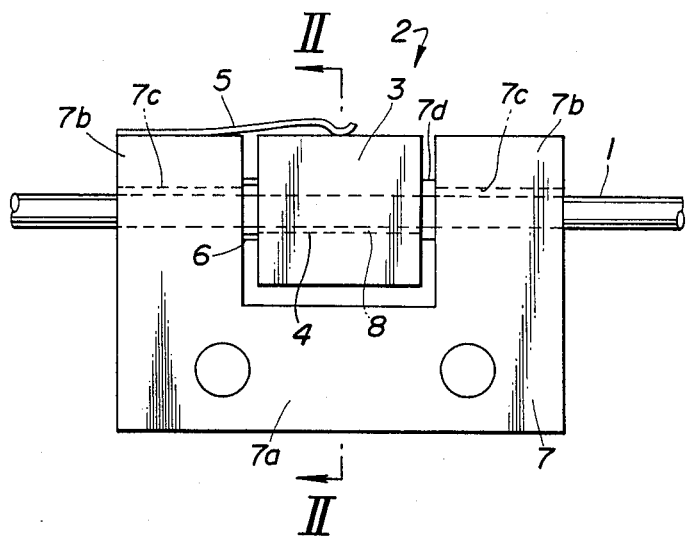
FIG. 1 is a plan view of the first embodiment of a magnetic reading head assembly according to the present invention.
Figure 2:
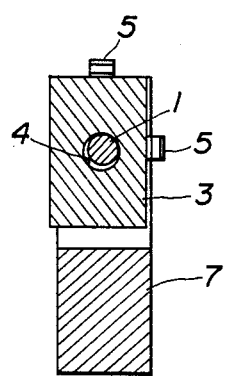
FIG. 2 is a cross-section taken along line II—II in FIG. 1.

Referring now to the drawings, particularly to FIGS. 1 and 2, a magnetic scale comprises a magnetic scale member 1 and a magnetic reading head assembly 2. The magnetic scale member 1 has the shape of a cylindrical rod or a flat strip. Although not illustrated in the drawings, the magnetic scale member 1 is supported within a scale channel in a per se well-known manner. In the shown embodiment, the magnetic scale member 1 is in the form of a cylindrical rod which is 2 to 4 mms in diameter. The cylindrical, rod-shaped magnetic scale member 1 is marked with a plurality of magnetic indicia at a given constant pitch, e.g. at a pitch $\lambda = 0.2$ mm.

The magnetic reading head assembly 2 comprises one or more magnetic reading head cores 3 and a head carriage 7. Each of the magnetic reading head cores 3 is formed with a through opening 4 accommodating the cylindrical, rod-shaped magnetic scale member 1. The head carriage 7 is essentially channel-shaped and has a section 7a extending substantially parallel to the magnetic scale member 1 and sections 7b extending from both ends of the section 7a perpendicular to the magnetic scale member 1. The sections 7b also have through openings 7c slidingly receiving the magnetic scale member 1.

In the shown embodiment, the magnetic reading heads 3 may comprises two-channel, flux-responsive, multi-gap magnetic heads for picking up signals representative of the relative displacement between the magnetic scale member 1 and the magnetic reading head assembly 2. Two-channel heads 3 are preferable for interpolation based on these signals. In this case, the signal phases of each pair of magnetic reading heads 3 should differ by $n\lambda/4$.

Figure 3:
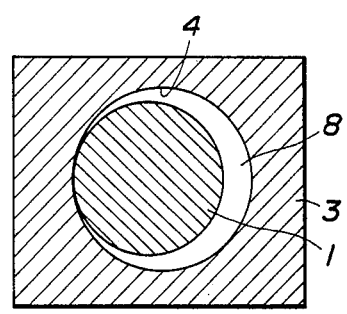
FIG. 3 is an enlarged section showing relationship between a magnetic scale member and a magnetic head.

The openings 6 and 7c in the magnetic reading head 3 and the head carriage 7 are slightly greater in diameter than the magnetic scale member 1, thus leaving a gap 8 of several $\mu$ms to several tens of $\mu$ms between the inner periphery of the openings and the outer periphery of the magnetic scale member, as shown in FIG. 3. This gap allows smooth movement of the magnetic reading head relative to the magnetic scale member 1. Also, this gap 8 helps compensate for the tolerances in the magnetic reading head and the magnetic scale member in order to allow assembly of the magnetic scale even if there are dimensional errors in their manufacture.

However, on the other hand, the gap 8 allows the magnetic reading head to yaw and roll during relative movement between the magnetic reading head and the magnetic scale member 1. This causes fluctuations in the output level of the magnetic reading head resulting in losses of accuracy of up to $(-2\pi d/\lambda)$ where d is the size of the gap. These fluctuations in the output level of the magnetic reading head 3 influence the results of measurement of the relative displacement between the magnetic reading head and the magnetic scale member. Especially when the two-channel heads are employed, the fluctuations in the output level of the magnetic reading heads may be reflected in interpolation errors, thus degrading measurement accuracy.

For instance, assuming the phase-modulated outputs $e_A$ and $e_B$ of a pair of magnetic reading heads 3 are offset by $\epsilon$, the output voltages can be expressed as:

$$e_A = K \sin(2\pi x/\lambda) \cos(\omega_o t)$$

$$e_B = K(1+\epsilon) \cos(2\pi x/\lambda) \sin(\omega_o t)$$

From the above, the phase error $\phi$ is illustrated by:

$$\phi = \frac{\epsilon}{2} \sin(4\pi x/\lambda) \text{ or}$$

$$= \frac{\epsilon \sin(4\pi x/\lambda)}{2}$$

Therefore, the percent error $\phi/2\pi$ becomes $\epsilon/4\pi$, and thus if the output level fluctuates by about 1%, the measurement error can be as much as 0.1%.

In order to avoid this defect in the prior art, the first embodiment of the magnetic reading head assembly according to the present invention employs a pair of resilient springs 5, one fixed to each of the sections 7b of the head carriage 7. The other ends of the resilient springs 5 press against the magnetic reading head 3 to bias the magnetic head perpendicular to the axis of the magnetic scale member 1. The resilient spring members 5 are so arranged as to exert biasing forces in directions perpendicular to each other. For instance, as best shown in FIG. 2, one of the resilient spring members 5 contacts side faces of the magnetic reading head 3 to bias the latter toward the section 7a of the head carriage 7. The other resilient spring member 5 contacts the bottom faces of the magnetic reading head 3 to bias the latter upwards. Therefore, the axis of the opening 4 through the magnetic reading head 3 remains parallel to but is offset downward and away from the section 7a of the head carriage 7 from the axis of the magnetic scale member 1.

As shown in FIG. 1, one of the sections 7b of the head carriage 7 has an extension 7d on the face opposing one longitudinal end face of the magnetic reading head 3. A compression coil spring 6 is seated between the other section 7b and the opposing longitudinal end face of the magnetic reading head 3. The compression coil spring 6 normally biases the magnetic reading heads 3 towards the extension 7d.

Therefore, the resilient spring members 5 restrict swaying movement of the magnetic reading head 3 perpendicular to the axis of the magnetic scale member 1. Also, the compression coil spring 6 restricts axial movement of the magnetic reading head 3.

It should be appreciated that the resilient spring members 5 should have sufficient resilient force to restrict swaying motion of the magnetic reading head relative to the magnetic scale member 1. On the other hand, the resilient spring members 5 should not be so strong that the frictional engagement between the inner periphery of the openings 4 of the magnetic reading heads 3 and the outer periphery of the magnetic scale member adversely affects smooth movement of the magnetic reading heads relative to the magnetic scale member.

It should be further noted that the shown orientation of the resilient forces of the resilient spring members 5 is not essential to the present invention. However, it is preferable to bias the magnetic reading head or heads 3 toward the magnetic scale member with resilient forces exerted essentially perpendicular to each other to ensure prevention of swaying movement of the magnetic reading head relative to the magnetic scale member. Furthermore, the compression coil spring 6 employed in the shown embodiment can be replaced by any resilient members which can exert an adequate axial biasing force to axially bias the magnetic reading head toward the extension 7d of the section 7b of the head carriage 7.

Therefore, according to the shown embodiment, the magnetic reading head 3 is normally biased into resilient contact between the inner periphery of the openings 4 and the outer periphery of the magnetic scale member 1, even while the magnetic reading head 3 is moving along the magnetic scale member 1. As a result, the play or gap 8 between the inner periphery of the openings 4 and the outer periphery of the magnetic scale member 1 will have no influence on measurement of the relative displacement between the magnetic reading head 3 and the magnetic scale member.

Figure 4:
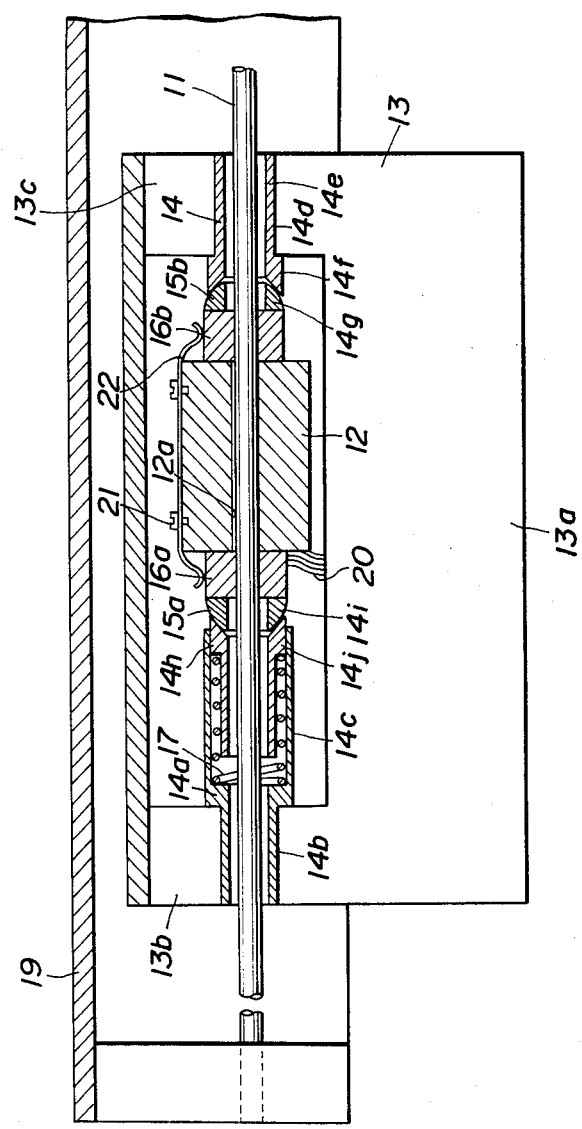
FIG. 4 is a partial sectional plan view of the second embodiment of a magnetic head assembly according to the invention.

FIG. 4 is a partially sectioned plan view of the second embodiment of a magnetic reading head assembly according to the present invention. In this embodiment, the magnetic reading head assembly generally comprises a magnetic reading head 12 which is connected to a lead 20, and a head carriage 13. The magnetic reading head 12 has a through opening 12a through which a magnetic scale member 11 extends. The magnetic scale member 11 is supported within a scale channel 19 in a per se well-known manner. The head carriage 13 is essentially channel-shaped and has a section 13a extending parallel to the magnetic scale member 11 and a pair of sections 13b and 13c extending perpendicularly from both ends of the section 13a. Both of the sections 13b and 13c have axial through openings through which the magnetic scale member 11 extends. A cylindrical member 14a with smaller- and larger-diameter sections 14b and 14c, respectively is secured to the section 13b by engagement between the smaller diameter section 14b and this through opening. Similarly, a cylindrical shell member 14d with smaller- and larger-external-diameter sections 14e and 14f respectively is secured to the section 13c by engagement between the smaller-external-diameter section 14e and the through opening. The cylindrical member 14d has a hemispherical recess 14g at the end of the larger-external-diameter section 14f. Another cylindrical member 14h is disposed within the cylindrical shell member 14a. The cylindrical member 14h has a hemispherical recess 14i at the end opposing the magnetic reading head 3. A compression coil spring 17 disposed within the cylindrical shell member 14a is seated between the step between the smaller-diameter section 14b and the larger-diameter section 14c at one end and at an outward flange 14j of the cylindrical member 14h at the other end. Therefore, the compression spring 17 constantly biases the cylindrical member 14h toward the magnetic reading head 12.

Essentially cylindrical bushings 16a and 16b are provided at both longitudinal end faces on the magnetic reading head 12. The bushings 16a and 16b are axially movable along the magnetic scale member 11 independently of the magnetic reading head. Hemispherical members 15a and 15b are fitted onto the distal faces of the bushings 16a and 16b. The hemispherical members 15a and 15b oppose the aforementioned hemispherical recesses 14g and 14i and comform thereto. The force of the compression spring 17 biases the cylindrical member 14h toward the magnetic reading head 13 and so establishes engagement between the hemispherical recess 14i and the corresponding hemispherical member 15a, and also biases the magnetic reading head via the bushing 16a toward the cylindrical member 14d and so establishes engagement between the hemispherical member 15b and the hemispherical recess 14g.

The longitudinal end faces of the magnetic reading head 12 lie essentially perpendicular to the axis of the magnetic scale member 11. The bushings 16a and 16b essentially conform to the opposing faces of the magnetic reading head and serve to hold the magnetic reading head in a specific spatial relationship with the magnetic scale member 11.

The cylindrical members 14a, 14d and 14h and the hemispherical members 15a and 15b all have axial openings of significantly greater diameter than the magnetic scale member 11 so that the internal surfaces thereof will not come into contact with the outer periphery of the magnetic scale member 11.

With this arrangement, when torsional moments are exerted on the head carriage 13, urging the latter to pitch or yaw, the torsional forces are absorbed by the couplings between the hemispherical members 15a and 15b and the hemispherical recesses 14g and 14i, so that no stress is applied to the magnetic reading head. Therefore, the profile of the magnetic reading head 12 can be held stable relative to the magnetic scale 11 irrespective of the swaying motion of the head carriage 13.

As shown in FIG. 4, the magnetic reading head assembly of the second embodiment is also provided with one or more resilient leaf springs 22 which are fixed to the magnetic head 12 by means of fastening screws 21. The longitudinal ends of the resilient leaf springs 22 contact the outer periphery of the bushings 16a and 16b to bias the latter against the magnetic scale member 11. Preferably, a pair of resilient leaf springs 22 are provided to bias the bushings 16a and 16b in mutually perpendicular directions. The resilient leaf springs 22, on the other hand, transmit an equal and opposite force to the magnetic reading head 12 and thus bias the latter in a direction opposite to the directions in which the bushings 16a and 16b are biased.

By biasing the magnetic reading head 12 against the magnetic scale member 11 in a manner substantially as noted in the first embodiment, swaying motion of the magnetic reading head can be successfuly prevented.

While the present invention has been disclosed in terms of the preferred embodiments in order to facilitate better understanding of the invention, it should be appreciated that the invention can be embodied in various ways without departing from the principles of the invention. Therefore, the invention should be understood to include all possible embodiments and modifications to the shown embodiments which can be embodied without departing from the principles of the invention set out in the appended claims.

What is claimed is:

1. A magnetic reading head assembly for a magnetic scale comprising:
    an elongated magnetic scale member;
    a magnetic head defining an axial opening through which said magnetic scale member extends so that said magnetic head moves along said magnetic scale member; and
    first means for permitting movement of said magnetic head along said said magnetic scale member and restricting movement of said magnetic head in a direction perpendicular to the axis of said magnetic scale member and thereby holding the axis of said axial opening substantially parallel to and in a predetermined positional relationship with the axis of said magnetic scale member, wherein said first means comprises a pair of resilient members biasing said magnetic head against said magnetic scale member so that the inner periphery of said axial opening of said magnetic head is in constant contact with the outer periphery of said magnetic scale member, said pair of resilient members being adapted to exert biasing forces in essentially perpendicular directions to each other.

2. A method for implementing measurement of relative displacement between an elongated magnetic scale member and a magnetic head defining an axial opening through which said magnetic scale member extends, comprising the steps of:
    applying a resilient force to said magnetic head for restricting swaying motion thereof relative to said magnetic scale, thereby holding the axis of said axial opening substantially parallel to the axis of said magnetic scale member and in a predetermined positional relationship therewith, wherein the inner periphery of said axial opening of said magnetic head contacts the outer periphery of said magnetic scale member in said predetermined positional relationship between the axis of said axial opening of said magnetic head and the axis of said magnetic scale member, and wherein said resilient force is applied to said magnetic head from two different directions so as to bias said magnetic head in two essentially perpendicular directions;
    causing sliding relative movement between said magnetic scale member and said magnetic head while holding the axis of said axial opening in said predetermined relationship with the axis of said magnetic scale; and
    measuring the magnitude of the relative displacement between said magnetic scale member and said magnetic head while holding the axis of said axial opening in said predetermined relationship with the axis of said magnetic scale member.

3. A magnetic reading head assembly for a magnetic scale which has an elongated magnetic scale member, comprising:
    a magnetic head defining an axial opening through which said magnetic scale member extends so that said magnetic head moves along said magnetic scale; and
    first means for applying resilient force to said magnetic head, which resilient force is exerted in a direction perpendicular to the axis of said magnetic scale member, for restricting movement of said magnetic head in a direction perpendicular to the axis of said magnetic scale member and thereby holding the axis of said axial opening substantially parallel to and in a paredetermined positional relationship with the axis of said magnetic scale member, wherein said first means comprises a first resilient spring exerting a first resilient force to said magnetic head in a first direction perpendicular to said axis of said magnetic scale member, and a second resilient spring exerting a second resilient force to said magnetic head in a second direction perpendicular to said axis of said magnetic scale member and peripendicular to said first direction.

4. A magnetic reading head assembly for a magnetic scale which has an elongated magnetic scale member, comprising:
    a magnetic head defining an axial opening through which said magnetic scale member extends so that said magnetic head moves along said magnetic scale; and
    first means for applying resilient force to said magnetic head, which resilient force is exerted in such a manner that the inner periphery of said axial opening of said magnetic head establishes line contact with the outer periphery of said magnetic scale member at a preetermined orientation in order to restrict movement of said magnetic head in a direction perpendicular to the axis of said magnetic scale member and thereby holding the axis of said axial opening substantially parallel to and in a predetermined positional relationship with the axis of said magnetic scale member, wherein said first means comprises a first resilient spring exerting a first resilient force to said magnetic head in a first direction perpendicular to said axis of said magnetic scale member, and a second resilient spring exerting a second resilient force to said magnetic head in a second direction perpendicular to said axis of said magnetic scale member and perpendicular to said first direction.

5. A magnetic reading head assembly for a magnetic scale which has an elongated magnetic scale member comprising:
    a magnetic head defining an axial opening through which said magnetic scale member extends so that said magnetic head moves along said magnetic scale member; and
    first means including a first resilient member exerting a first resilient force to said magnetic head in a first direction which is perpendicular to said axis of said magnetic scale member and a second resilient member exerting a second resilient force to said magnetic head in a second direction perpendicular to said axis of said magnetic scale member, which second direction is angularly offset from said first direction, said first and second resilient members being cooperative with each other for restricting movement of said magnetic head in a direction peripendicular to the axis of said magnetic scale member and thereby holding the axis of said axial opening substantially parallel to and in a predetermined positional relationship with the axis of said magnetic scale member.

6. A magnetic scale comprising:

an elongated magnetic scale member;

a magnetic head defining an axial opening through which said magnetic scale member extends so that said magnetic head moves along said magnetic scale member; and means including a first resilient member exerting a first resilient force to said magnetic head in a first direction which is perpendicular to said axis of said magnetic scale member and a second resilient member exerting a second resilient force to said magnetic head in a second direction perpendicular to said axis of said magnetic scale member, which second direction is angularly offset from said first direction, said first and second resilient members being cooperative with each other for restricting movement of said magnetic head in a direction peripendicular to the axis of said magnetic scale member and thereby holding the axis of said axial opening substantially parallel to and in a predetermined positional relationship with the axis of said magnetic scale member.

7. A magnetic reading head assembly comprising:

a magnetic head defining an axial opening through which said magnetic scale member extends so that said magnetic head moves along said magnetic scale; and first means for applying resilient force to said magnetic head, which resilient force is exerted in a direction perpendicular to the axis of said magnetic scale member, said resilient force including a first component to be exerted on a first point of said scale member in a first direction perpendicular to the axis of said scale member and a second component to be exerted on a second point of said scale member circumferentially offset from said first point in a second direction perpendicular to said axis of said scale member so that said resilient force depresses said magnetic head in a direction corresponding to the direction of resultant force of said first and second force components to establish play-restricting contact between a predetermined angular position of said inner periphery of said axial opening of said magnetic head and the outer periphery of said magnetic scale member, for restricting movement of said magnetic head in a direction perpendicular to the axis of said magnetic scale member and thereby holding the axis of said axial opening substantially parallel to and in a predetermined positional relationship with the axis of said magnetic scale member.

8. A magnetic reading head assembly for a magnetic scale which has an elongated magnetic scale member, comprising:

a magnetic head defining an axial opening through which said magnetic scale member extends so that said magnetic head moves along said magnetic scale; and first means for applying a resilient force to said magnetic head, which first means includes a first resilient component to be exerted on a first point of said scale member in a first direction perpendicular to the axis of said scale member and a second resilient component to be exerted on a second point of said scale member circumferentially offset from said first point in a second direction perpendicular to said axis of said scale member so that said resilient force depresses said magnetic head in said direction corresponding to the direction of resultant force of said first and second force components to establish play-restricting contact between a predetermined angular position of said inner periphery of said axial opening of said magnetic head and the outer periphery of said magnetic scale member establishing a line contact with the outer periphery of said magnetic scale member at a predetermined orientation in order to restrict movement of said magnetic head in a direction peripendicular to the axis of said magnetic scale member and thereby holding the axis of said axial opening parallel to and in a predetermined positional relationship with the axis of said magnetic scale member.

* * * * *